(12) United States Patent
Fattal et al.

(10) Patent No.: US 11,709,305 B2
(45) Date of Patent: Jul. 25, 2023

(54) COLLIMATED BACKLIGHT, ELECTRONIC DISPLAY, AND METHOD EMPLOYING AN ABSORPTION COLLIMATOR

(71) Applicant: LEIA INC., Menlo Park, CA (US)

(72) Inventors: David A. Fattal, Menlo Park, CA (US); Ming Ma, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/580,581

(22) Filed: Jan. 20, 2022

(65) Prior Publication Data
US 2022/0146733 A1    May 12, 2022

Related U.S. Application Data

(63) Continuation of application No. PCT/US2019/068196, filed on Dec. 21, 2019.

(60) Provisional application No. 62/881,917, filed on Aug. 1, 2019.

(51) Int. Cl.
*F21V 8/00*    (2006.01)

(52) U.S. Cl.
CPC ............. *G02B 6/003* (2013.01); *G02B 6/005* (2013.01); *G02B 6/0016* (2013.01); *G02B 6/0036* (2013.01); *G02B 6/0068* (2013.01)

(58) Field of Classification Search
CPC combination set(s) only.
See application file for complete search history.

(56) References Cited

U.S. PATENT DOCUMENTS

| | | |
|---|---|---|
| 9,128,226 B2 | 9/2015 | Fattal et al. |
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |

(Continued)

FOREIGN PATENT DOCUMENTS

| | | |
|---|---|---|
| CN | 108153059 A | 6/2018 |
| JP | 2005321754 A | 11/2005 |

(Continued)

OTHER PUBLICATIONS

International Search Report and Written Opinion (ISRWO) by International Searching Authority (ISA) Korean ntellectual Property Office (KIPO) dated Apr. 29, 2020 (11 pages) for foreign counterpart parent International Application No. PCT/US2019/068196.

(Continued)

*Primary Examiner* — Leah Simone Macchiarolo
(74) *Attorney, Agent, or Firm* — J. Michael Johnson

(57) ABSTRACT

A collimated backlight and an electronic display employ a light guide having angle-preserving scattering feature and an absorption collimator. The angle-preserving scattering feature is configured to scatter a portion of guided light out of the light guide as emitted light. The absorption collimator includes an absorption element and is configured to convert light provided by a light source into collimated light to be guided as the guided light. The electronic display includes an array of light valves and may be configured as a multi-view display or a privacy display.

20 Claims, 8 Drawing Sheets

(56) References Cited

U.S. PATENT DOCUMENTS

| | | | |
|---|---|---|---|
| 10,551,546 B2 | 2/2020 | Fattal | |
| 10,649,128 B2 | 5/2020 | Fattal et al. | |
| 10,649,248 B1* | 5/2020 | Fan Jiang | H04N 7/141 |
| 10,705,281 B2 | 7/2020 | Fattal et al. | |
| 10,798,371 B2 | 10/2020 | Fattal | |
| 10,802,212 B2 | 10/2020 | Fattal | |
| 10,802,443 B2 | 10/2020 | Fattal | |
| 10,810,917 B2 | 10/2020 | Fattal | |
| 10,830,939 B2 | 11/2020 | Fattal et al. | |
| 10,838,134 B2 | 11/2020 | Fattal et al. | |
| 10,884,175 B2 | 1/2021 | Fattal | |
| 10,928,564 B2 | 2/2021 | Fattal | |
| 10,928,677 B2 | 2/2021 | Aieta et al. | |
| 10,969,627 B2 | 4/2021 | Fattal et al. | |
| 11,004,407 B2 | 5/2021 | Fattal et al. | |
| 11,016,235 B2 | 5/2021 | Fattal et al. | |
| 11,016,238 B2 | 5/2021 | Fattal et al. | |
| 11,041,988 B2 | 6/2021 | Fattal et al. | |
| 11,048,036 B2 | 6/2021 | Ma et al. | |
| 11,048,037 B2 | 6/2021 | Fattal et al. | |
| 11,143,810 B2 | 10/2021 | Fattal et al. | |
| 11,143,811 B2 | 10/2021 | Fattal et al. | |
| 11,200,855 B2 | 12/2021 | Fattal | |
| 2007/0125971 A1 | 6/2007 | Wimberger-Friedl et al. | |
| 2009/0322986 A1 | 12/2009 | Wei et al. | |
| 2011/0317399 A1 | 12/2011 | Hsu | |
| 2012/0200807 A1 | 8/2012 | Wei et al. | |
| 2013/0076798 A1 | 3/2013 | Wang et al. | |
| 2013/0169518 A1 | 7/2013 | Wu et al. | |
| 2017/0184776 A1 | 6/2017 | El-Ghoroury et al. | |
| 2017/0235188 A1* | 8/2017 | Large | G02F 1/133509 349/68 |
| 2017/0363794 A1 | 12/2017 | Wan et al. | |
| 2019/0018186 A1 | 1/2019 | Fattal | |
| 2019/0155105 A1 | 5/2019 | Aieta et al. | |
| 2020/0018891 A1 | 1/2020 | Fattal et al. | |
| 2020/0301165 A1 | 9/2020 | Fattal | |
| 2020/0310135 A1 | 10/2020 | Fattal | |
| 2021/0157050 A1 | 5/2021 | Fattal | |
| 2021/0390914 A1 | 12/2021 | Fattal | |
| 2021/0407438 A1 | 12/2021 | Fattal | |

FOREIGN PATENT DOCUMENTS

| | | |
|---|---|---|
| KR | 20180105151 A | 9/2018 |
| WO | 2012038856 A1 | 3/2012 |
| WO | 2108182991 A1 | 10/2018 |
| WO | 2021076114 A1 | 4/2021 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech. Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

* cited by examiner

COLLIMATED BACKLIGHT, ELECTRONIC DISPLAY, AND METHOD EMPLOYING AN ABSORPTION COLLIMATOR

CROSS-REFERENCE TO RELATED APPLICATIONS

This application is a continuation patent application of and claims priority to International Patent Application No. PCT/US2019/068196, filed Dec. 21, 2019, which claims the benefit of priority to U.S. Provisional Application Ser. No. 62/881,917, filed on Aug. 1, 2019, the contents of each of which are herein incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide collimated backlighting having angle preserving scattering and employing an absorption collimator with application to electronic displays and, in particular, multiview displays and privacy displays. In various embodiments consistent with the principles described herein, a collimated backlight including an angle-preserving scattering feature is provided. The angle-preserving scattering feature is configured to provide emitted light that may have light beams with a plurality of different principal angular directions, in some embodiments. The different principal angular directions of the light beams of the emitted light may correspond to directions of various different views of a multiview display, for example. In other embodiments, the emitted light is narrow-angle emitted light used to limit a viewing angle or range of a privacy display. Further, according to various embodiments, the collimated backlight includes an absorption collimator configured to reduce spreading out light from a light source to provide collimated light within the backlight. In addition, the absorption collimator may provide spatio-angularly homogenous light or light having a substantially spatio-angularly homogenous distribution within the collimated backlight, according to some embodiments. The spatio-angularly homogenous light may facilitate or provide substantially uniform illumination across the collimated backlight, avoiding striping, for example.

Figure 1A:
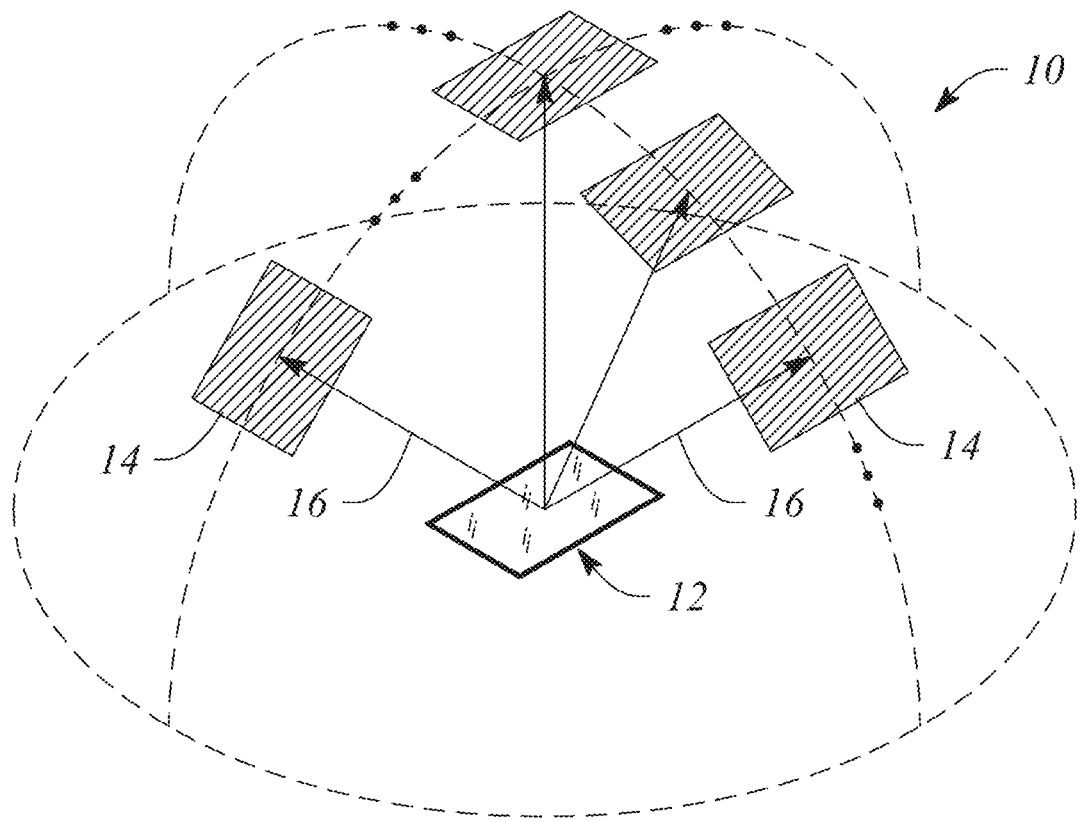
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
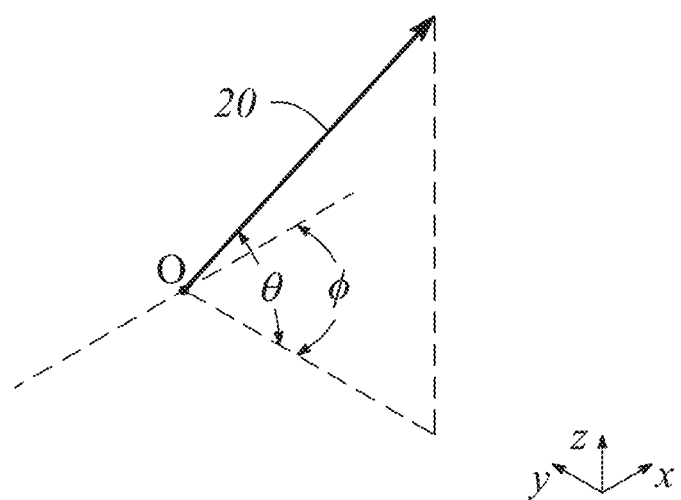
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing 'view' pixels in each of a similar plurality of different views of a multiview display. In particular, a multiview pixel may have an individual view pixel corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may scatter or couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively scatter out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various embodiments described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
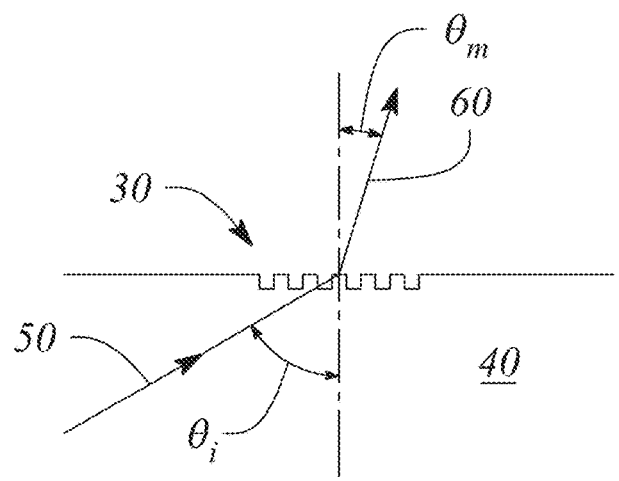
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and scattered-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling out a portion of light guided in the light guide. In other embodiments, the multibeam element may generate light emitted as the light beams (e.g., may comprise a light source). Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

By definition herein, the term 'narrow-angle' as used in 'narrow-angle emitted light' is light having an angular range or extent (e.g., cone angle) that is consistent with providing illumination of a private view zone or a private image that is displayed or otherwise made available within the private view zone. As such, narrow-angle emitted light may have an angular range of less than about ±45°, or less than about ±30°, or less than about ±20°, by definition herein. Further, by definition, 'broad-angle emitted light' (e.g., emitted by a broad-angle backlight) or more generally 'broad-angle' is used to refer to light having angular range or extent that is generally greater than an angular range or extent of the narrow-angle emitted light. Alternatively, 'broad-angle' refers to an angular range or extend consistent with a view zone of a public displayed image or a display configured to display a public displayed image. As such, in some embodiments, the broad-angle emitted light may have an angular range that is greater than plus and minus forty-five degrees (e.g., >±45°) relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°).

Herein, 'spatio-angularly homogenous' light is defined as light that is distributed in a uniform or substantially uniform manner across a spatial and angular region. Further, spatio-angularly homogenous light may also comprise a plurality of light beams having a defined angular spread and a common or substantially common propagation direction within a defined strip or space representing the region, by definition herein. In general, spatio-angularly homogenous light within a light guide may ensure that light is distributed uniformly within the light guide. For example, light from a discrete light source that is provided to a light guide as spatio-angularly homogenous light may substantially fill a region of the light guide defined by a predetermined width, the predetermined width being orthogonal to a propagation direction of guided light within the light guide. When a plurality of discrete light sources are used to illuminate the light guide, the predetermined width may correspond to, and in some embodiments be substantially equal to, a spacing between discrete light sources of the discrete light source plurality, for example. As such, spatio-angularly homogenous light may mitigate or even eliminate striping of light (e.g., bright bands of light with intervening dark regions or bands) within and along the light guide.

Further, as used herein, the article 'a' is intended to have its ordinary meaning in the patent arts, namely 'one or more'. For example, 'an angle-preserving scattering feature' means one or more angle-preserving scattering features and as such, 'the angle-preserving scattering feature' means 'the angle-preserving scattering feature(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
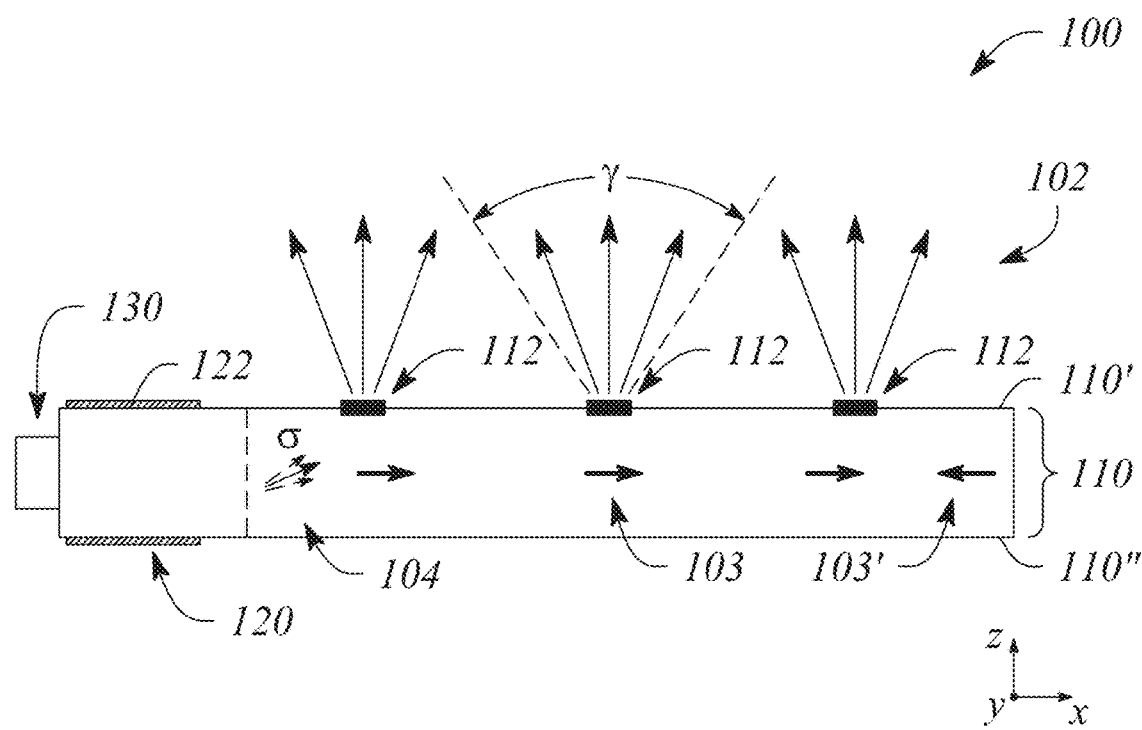
FIG. 3A illustrates a cross sectional view of a collimated backlight in an example, according to an embodiment consistent with the principles described herein.
Figure 3B:
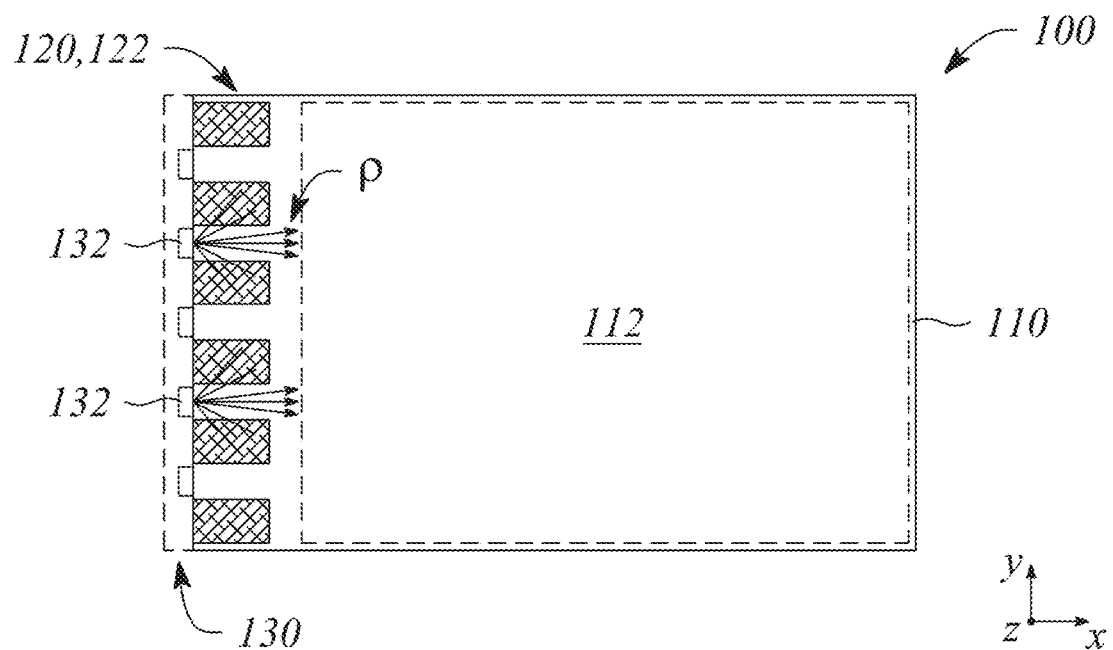
FIG. 3B illustrates a plan view of a collimated backlight in an example, according to an embodiment consistent with the principles described herein.
Figure 3C:
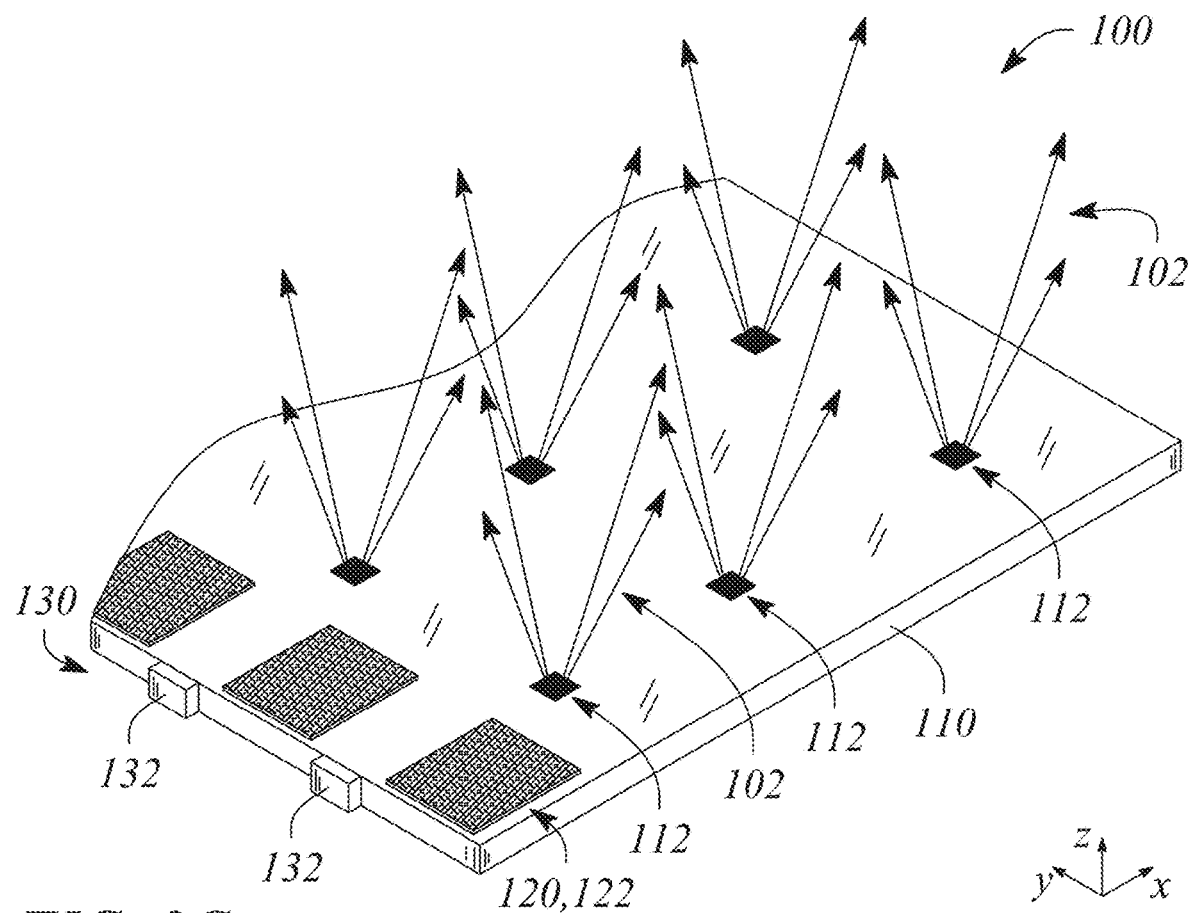
FIG. 3C illustrates a perspective view of a collimated backlight in an example, according to an embodiment consistent with the principles described herein.

According to some embodiments of the principles described herein, a collimated backlight is provided. FIG. 3A illustrates a cross sectional view of a collimated backlight 100 in an example, according to an embodiment consistent with the principles described herein. FIG. 3B illustrates a plan view of a collimated backlight 100 in an example, according to an embodiment consistent with the principles described herein. FIG. 3C illustrates a perspective view of a collimated backlight 100 in an example, according to an embodiment consistent with the principles described herein. The illustrated collimated backlight 100 may be used backlighting in an electronic display including, but not limited to, a multiview display, for example.

The collimated backlight 100 illustrated in FIGS. 3A-3C is configured to provide scattered-out or emitted light 102. The emitted light 102 is directed away from a surface of the collimated backlight 100, as illustrated in FIG. 3A. The emitted light 102 may be employed to illuminate or serve as an illumination source for an electronic display. In particular, the emitted light 102 may be modulated to facilitate the display of information (e.g., images) by the electronic display, for example. In some embodiments, the emitted light 102 may be modulated (e.g., using light valves, as described below) to facilitate the display of information having 3D content or being represented as a multiview image. In other embodiments, the emitted light 102 may be narrow-angle emitted light that when modulated is configured to provide a privacy image having a limited viewing angle of displayed content.

In some embodiments (e.g., as described below with respect to a multiview backlight), the emitted light 102 may comprises a plurality of directional light beams in which different ones of the directional light beams have different principal angular directions from one another. For example, the plurality of light beams may represent a light field. Further, the directional light beams have a predetermined angular spread. That is, the principal angular directions of the light beams of the emitted light 102 may be constrained to be substantially within a predetermined subtended angle γ. For example, the predetermined subtended angle γ (or equivalently the angular spread γ) may be defined the with respect to a central light beam of the directional light beam plurality. Further, according to some embodiments, the provided plurality of directional light beams of the emitted light 102 may be directed away from the collimated backlight 100 in different principal angular directions corresponding to respective view directions of a multiview display, e.g., a multiview display that may be used to display a 3D or multiview image. As such, the collimated backlight 100 may be either a multiview backlight or alternatively a privacy backlight according to various embodiments, as described further below.

As illustrated in FIG. 3A-3C, the collimated backlight 100 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material of the optical waveguide may have a first refractive index that is greater than a second refractive index of a medium surrounding the dielectric optical waveguide. The difference in refractive indices is configured to facilitate total internal reflection of the guided light 104 according to one or more guided modes of the light guide 110. In FIG. 3A, a propagation direction 103 of the guided light 104 is indicated by bold arrows.

In some embodiments, the dielectric optical waveguide of the light guide 110 may be a slab or plate optical waveguide comprising an extended, substantially planar sheet of optically transparent, dielectric material. According to various examples, the optically transparent, dielectric material of the light guide 110 may include or be made up of any of a variety of dielectric materials including, but not limited to, one or more of various types of glass (e.g., silica glass, alkali-aluminosilicate glass, borosilicate glass, etc.), one or more substantially optically transparent plastics or polymers (e.g., poly(methyl methacrylate) or 'acrylic glass', polycarbonate, etc.) or a combination thereof. In some embodiments, the light guide 110 may further include a cladding layer (not illustrated) on at least a portion of a surface (e.g., one or both of a top surface and a bottom surface) of the light guide 110. The cladding layer may be used to further facilitate total internal reflection, according to some examples.

According to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 may propagate by reflecting or 'bouncing' between the first surface 110' and the second surface 110" of the light guide 110 at the non-zero propagation angle (albeit in the propagation direction 103 indicated by the bold arrows). In some embodiments, a plurality of guided light beams comprising different colors of light may be guided by the light guide 110 at respective ones of different color-specific, non-zero propagation angles. The non-zero propagation angle is not illustrated in FIGS. 3A-3C for simplicity of illustration.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110. Further, the guided light 104 or equivalently the guided light 'beam' 104 may be a collimated light beam (e.g., provide by an absorption collimator, described below), according to various embodiments. Herein, a 'collimated light' or 'collimated light beam' is generally defined as a beam of light in which rays of the light beam are substantially confined to a predetermined or defined angular spread within the light beam (e.g., the guided light 104). Further, rays of light that diverge or are scattered from the collimated light beam are not considered to be part of the collimated light beam, by definition herein. Moreover, the guided light 104 may be collimated according to or having a collimation factor, in various embodiments.

In some embodiments, the light guide 110 may be configured to 'recycle' the guided light 104. In particular, the guided light 104 that has been guided along the light guide length may be redirected back along that length in another propagation direction 103' that differs from (e.g., is opposite to) the propagation direction 103. For example, the light guide 110 may include a reflector (not illustrated) at an end of the light guide 110 opposite to an input end or entrance edge adjacent to the light source. The reflector may be configured to reflect the guided light 104 back toward the entrance edge as recycled guided light. In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103). Recycling guided light 104 or alternatively providing guided light 104 in the other propagation direction 103' may increase a brightness of the collimated backlight 100 (e.g., an intensity of the directional light beams of the emitted light 102) by making guided light available to be scattered out of the collimated backlight 100 more than once, for example, e.g., by angle-preserving scatterers described below.

According to various embodiments, the light guide 110 has an angle-preserving scattering feature 112. The angle-preserving scattering feature 112 is configured to scatter a portion of the guided light 104 out of the light guide 110 as the emitted light 102. In some embodiments (e.g., as illustrated), the angle-preserving scattering feature 112 comprises a plurality or an array of angle-preserving scattering elements. In particular, individual angle-preserving scattering elements of the angle-preserving scattering feature 112 may be discrete structures or features that are spaced apart from one another, each discrete structure being configured to scatter or couple out a different portion of the guided light 104 in an angle-preserving manner. In various embodiments, the angle-preserving scattering feature 112 may comprise any of variety of different structures or features that provide or are configured to produce angle-preserving scattering including, but not limited to, a diffraction grating, a reflective structure and a refractive structure as well as various combinations thereof.

Further, according to various embodiments, an angular spread of the emitted light 102 or equivalently of the directional light beams of the emitted light 102 is determined by a characteristic of the angle-preserving scattering feature 112. In particular, the angle-preserving scattering feature 112 is configured to scatter a portion of the guided light 104 out of the light guide 110 as the emitted light 102 having the angular spread characterized by a predetermined subtended angle γ. As a result, the emitted light 102 may be substantially confined within the predetermined subtended angle γ (or equivalently within the angular spread) as a result of the scattering by the angle-preserving scattering feature 112. Moreover, the angular spread of the emitted light 102 is a function of, and in some embodiments is proportional to, the collimation factor of the guided light 104. For example, the predetermined subtended angle γ of the angular spread (or equivalently the 'angular spread') may be given by equation (2) as $$\gamma = f(\sigma) \quad (2)$$

where σ is the collimation factor of the guided light 104 and $f(\cdot)$ represents a function such as, but not limited to, a linear function of the collimation factor σ. For example, the function $f(\cdot)$ may be given as γ=a·σ, where a is an integer. In some embodiments, the collimation factor σ of the guided light 104 that determines the predetermined angular spread may comprise a pair of orthogonal collimation factors (e.g., a collimation factor in a width direction and a collimation factor in a vertical or height direction). As such, the predetermined angular spread of the emitted light 102 provided by scattering the guided light 104 having the collimation factor σ may likewise be represented by an orthogonal pair of predetermined subtended angles (e.g., $\gamma_x$ in an x-direction or x-z plane and $\gamma_y$ in a y-direction or y-z plane).

As illustrated in FIGS. 3A-3C, the collimated backlight 100 further comprises an absorption collimator 120. According to various embodiments (e.g., as illustrated), the absorption collimator 120 may be located between a source of light (e.g., a light source 130, described below) used to provide light to be guided as the guided light 104 in the light guide 110 and the angle-preserving scattering feature 112 of the light guide 110. The absorption collimator 120 is configured to convert the light provided to the light guide 110 by the source of light into collimated light within the light guide.

That is, the absorption collimator 120 is configured to receive the provided light from the source of light and then to selectively absorb a portion of the provided light to collimate the light across a width of the light guide. Further, the absorption collimator 120 is configured to collimate the light provided by the light source according to a collimation factor ρ in a width direction (e.g., y-direction, as illustrated) orthogonal to a propagation direction 103 (e.g., x-direction, as illustrated) of the guided light 104. The collimated light then becomes light to be guided within the light guide 110 as the guided light 104 according to the collimation factor in the width direction.

FIG. 3B illustrates light from the source of light (e.g., light source 130) within the light guide 110 as arrows extending in various radial directions to depict the light provided to the light guide 110. As illustrated by the arrows, a portion of the light may simply pass through the absorption collimator 120, while another portion may be absorbed by the absorption collimator 120. The collimated light within the light guide 110 may facilitate uniform illumination of the collimated backlight 100, according to various embodiments. Further the guided light may exit the absorption collimator as the collimated light that is collimated in the width direction according to the collimation factor ρ, as is further illustrated in FIG. 3B.

In some embodiments, an angular spread of the collimated light that is guided within the light guide 110 may be collimated in a vertical or height direction in addition to the width direction. In particular, the angular spread of the collimated light may be collimated according to a collimation factor σ. According to various embodiments, the collimation factor σ may be configured to provide a predetermined angular spread of the guided light 104 in the vertical or z-direction. Collimation in the vertical or z-direction may be provided by a collimator of the light source (e.g., light source 130), for the example.

According to various embodiments, the absorption collimator 120 illustrated in FIGS. 3A-3C comprises an absorption element 122 that extends parallel to or substantially parallel to a propagation direction (e.g., propagation direction 103) of the guided light 104 within the light guide 110. For example, the absorption element 122 may comprise region comprising an absorptive material that extends in a direction away from an input edge of the light guide 110 (e.g., adjacent to the light source 130 in FIGS. 3A-3C) and toward the angle-preserving scattering feature 112 of the light guide 110. As illustrated in FIG. 3B, the light provided by the source of light may interact with and be absorbed by the absorption element 122 to convert the provided light into collimated light, e.g., as illustrated by arrows in FIG. 3B.

In some embodiments, the absorption element 122 may comprise a material of the light guide 110, e.g., the absorptive material may be provided within a guiding portion of the light guide 110. In other embodiments, the absorption element 122 may comprise a layer of absorptive material on the light guide surface. Further according to various embodiments, the absorption element 122 of the absorption collimator 120 may be located on, in or adjacent to opposing surfaces of the light guide 110. For example, the absorptive material of the absorption element 122 may be located on one or both of the first surface 110' and the second surface 110" of the light guide 110. In some embodiments and examples, the absorption element 122 of the absorption collimator 120 may comprise a tape or film (e.g., black tape), while in other embodiments and examples, the absorption element 122 may comprise a paint (e.g., black paint) that is applied to the light guide surface. In various embodiments, substantially any material that absorbs light and that may be provided in a region of the light guide 110 corresponding to the absorption element 122 may be employed.

As illustrated in FIGS. 3A-3C, the collimated backlight 100 may further comprise a light source 130. According to various embodiments, the light source 130 is configured to provide the light to light guide 110 to be guided as the guided light 104, the provided light first passing through the absorption collimator 120 to convert the provided light into the collimated light and then continuing on as the guided light 104. In particular, the light source 130 may be located adjacent to the input edge of the light guide 110 and the absorption collimator 120 may be located between the light source 130 and the angle-preserving scatter feature 112 of the light guide 110. In some embodiments (e.g., as illustrated), the light source 130 may comprise a plurality of optical emitters 132 spaced apart from one another along the input edge of the light guide 110.

In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments (e.g., as illustrated in FIGS. 3A-3C), the absorption element 122 of the absorption collimator 120 may comprise a plurality of separate or individual absorption elements 122 located between optical emitters of the optical emitter plurality of the light source 130. Here, the 'width dimension' or simply 'width' is defined as a dimension in a direction corresponding to a width of the light guide 110. The light guide 'width', in turn, is defined as a dimension along or corresponding to ay-axis, as illustrated in FIGS. 3A-3C, which is in a plane that is substantially orthogonal to the general propagation direction the guided light 104. The width of the light guide 110 is also substantially perpendicular to a height or thickness of the light guide 110, e.g., a dimension along or corresponding to a z-axis illustrated in FIGS. 3A-3C. In some embodiments, a length or a length profile of the absorption element 122 may vary in the propagation direction 103 of the guided light 104. In particular, the length profile may vary as a function of distance along the input edge of the light guide 110. Varying characteristics of the absorption element 122 may be configured to tailor an intensity distribution or a spread angle of the guided light 104 within the light guide 110, according to some embodiments.

Figure 4:
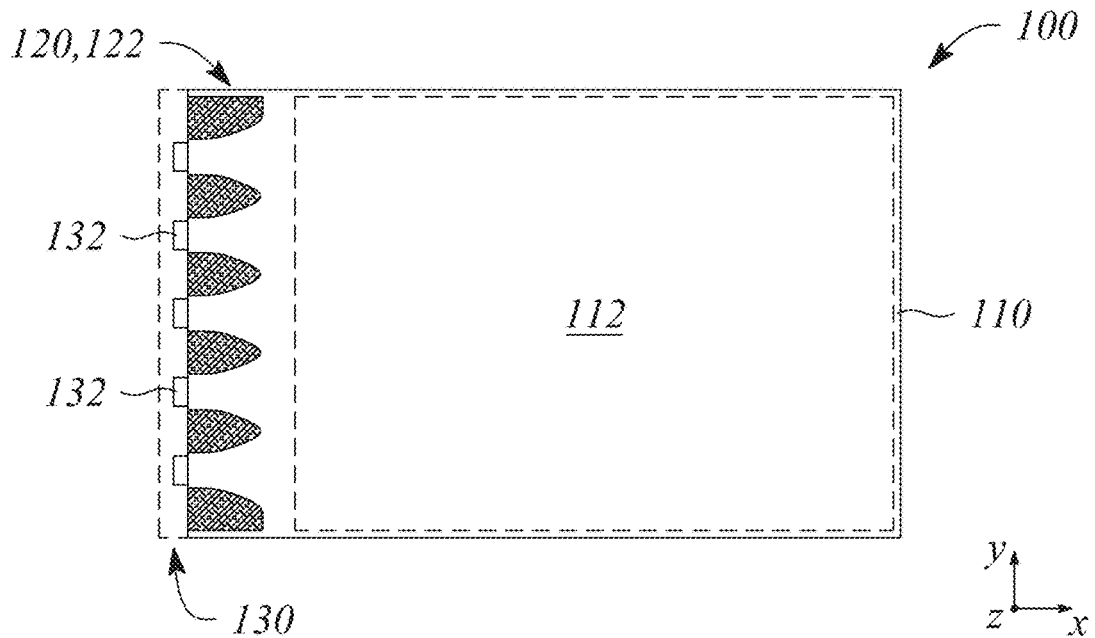
FIG. 4 illustrates a plan view of a collimated backlight in an example, according to another embodiment consistent with the principles described herein.

FIG. 4 illustrates a plan view of a collimated backlight 100 in an example, according to another embodiment consistent with the principles described herein. In particular, FIG. 4 illustrates the collimated backlight 100 including the light guide 110 having the angle-preserving scattering feature 112, the light source 130 at an input edge of the light guide 110, the absorption collimator 120 between the light source 130 and the angle-preserving scattering feature 112. FIG. 4 also illustrates the absorption element 122 comprising the plurality of individual absorption elements 122 spaced apart from one another and being located between optical emitters 132 of the light source 130, e.g., similar to FIG. 3B. Further, FIG. 4 illustrates the absorption element 122 having a length profile that varies as a function of distance along the width of the light guide 110. In particular, individual absorption elements 122 of the plurality of individual absorption element 122 have diffractive features that are longer in a middle of the individual absorption element 122 than at an edge thereof. The varying length profile of the absorption element (s) 122 may be used to control an amount of absorption of the provided light by the absorption collimator 120 or equivalently to control a degree of illumination uniformity provide by the collimated light, for example.

Referring again to FIG. 3A-3C, in some embodiments the angle-preserving scattering feature 112 of the light guide 110 in the collimated backlight 100 may comprise a multibeam element. In particular, the angle-preserving scattering feature 112 illustrated in FIGS. 3A-3C may comprise a plurality of multibeam elements. The collimated backlight 100 with a light guide 110 having an angle-preserving scattering feature 112 comprising a multibeam element may be referred to as a 'multibeam' backlight, as is further described in more detail below.

Figure 5A:
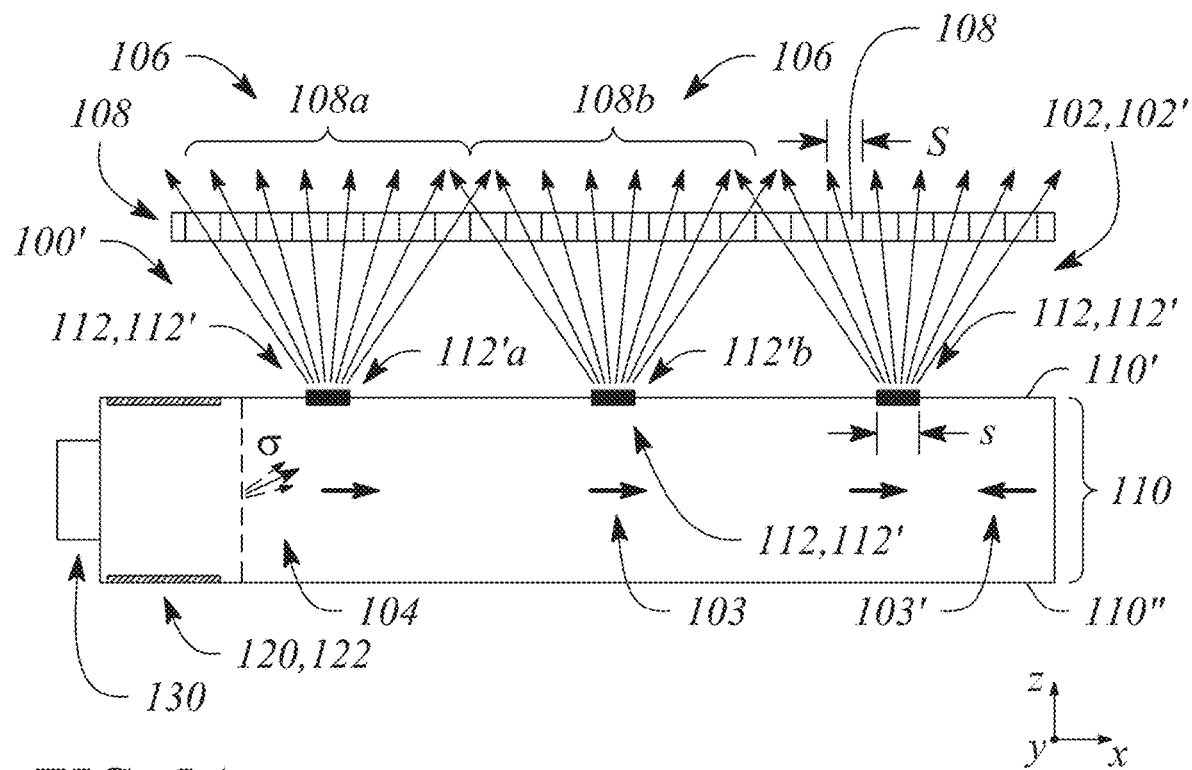
FIG. 5A illustrates a cross sectional view of a multiview backlight in an example, according to an embodiment consistent with the principles described herein.
Figure 5B:
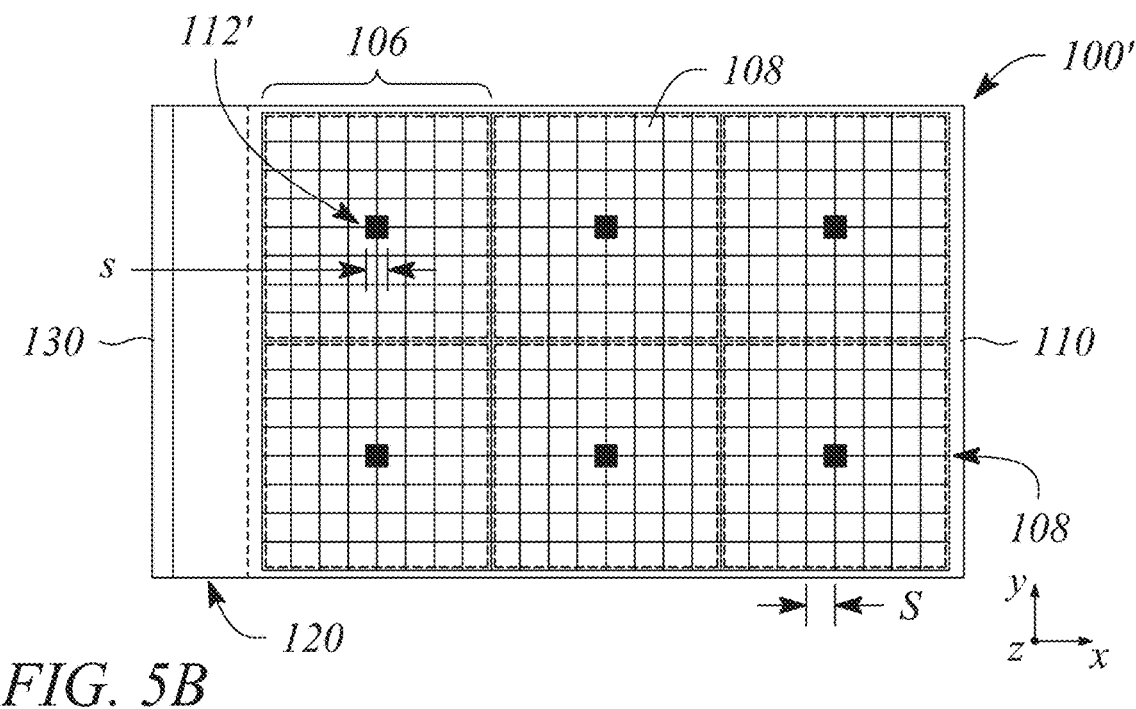
FIG. 5B illustrates a plan view of a multiview backlight in an example, according to an embodiment consistent with the principles described herein.
Figure 5C:
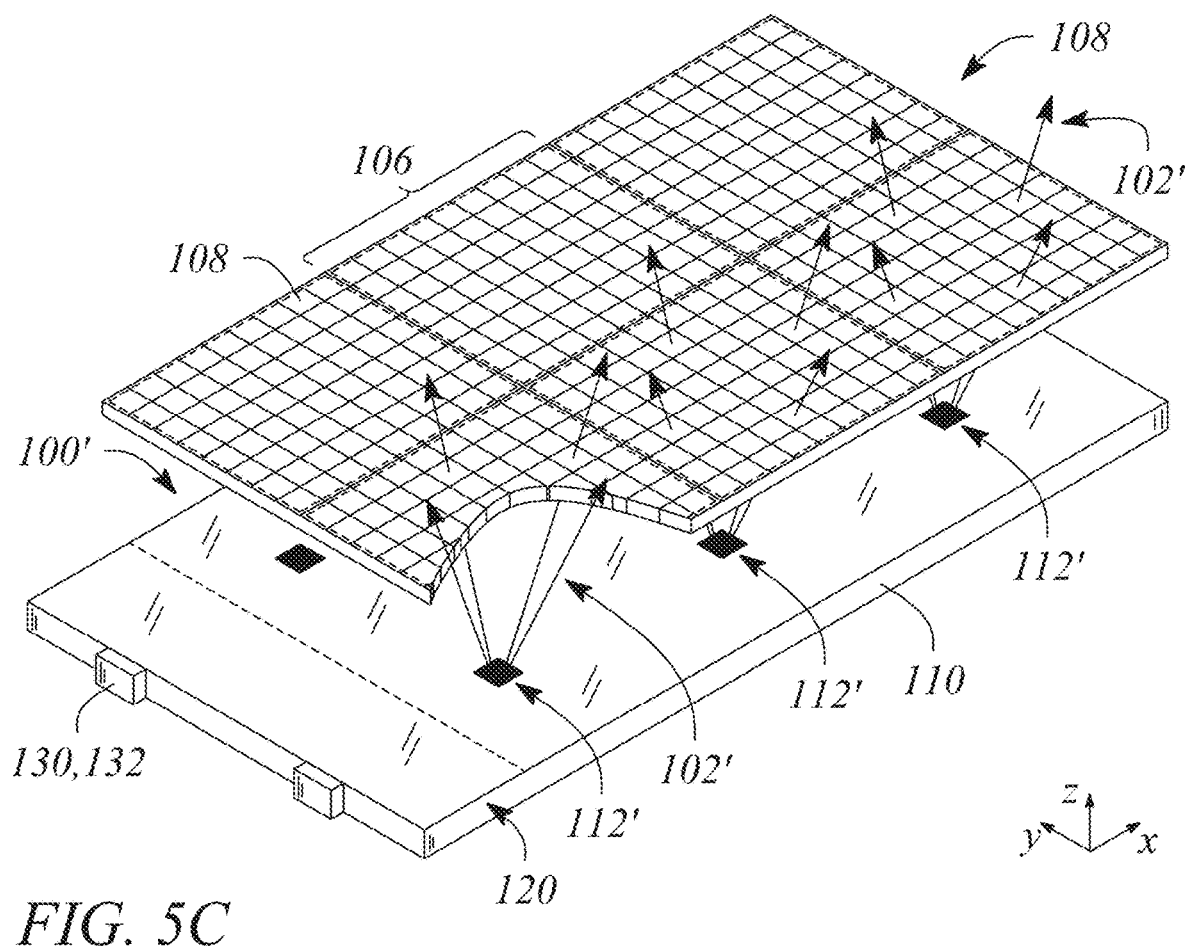
FIG. 5C illustrates a perspective view of a multiview backlight of in an example, according to an embodiment consistent with the principles described herein.

FIG. 5A illustrates a cross sectional view of a multiview backlight 100' in an example, according to an embodiment consistent with the principles described herein. FIG. 5B illustrates a plan view of a multiview backlight 100' in an example, according to an embodiment consistent with the principles described herein. FIG. 5C illustrates a perspective view of a multiview backlight 100' in an example, according to an embodiment consistent with the principles described herein. As illustrated, the multiview backlight 100' comprises the light guide 110 having the angle-preserving scattering feature 112 and the absorption collimator 120 (not illustrated in FIG. 5B). Further, the angle-preserving scattering feature 112 illustrated in FIGS. 5A-5C comprises a plurality of multibeam elements 112'.

According to various embodiments, multibeam elements 112' of the multibeam element plurality may be spaced apart from one another along a length of the light guide 110. In particular, the multibeam elements 112' may be separated from one another by a finite space and represent individual, distinct elements along the light guide length. Further the multibeam elements 112' generally do not intersect, overlap or otherwise touch one another, according to some embodiments. That is, each multibeam element 112' of the multibeam element plurality is generally distinct and separated from other ones of the multibeam elements 112'.

According to some embodiments, the plurality of multibeam elements 112' of the angle-preserving scattering feature 112 may be arranged in either a one-dimensional (1D) array or two-dimensional (2D) array. For example, the plurality of multibeam elements 112' may be arranged as a linear 1D array. In another example, the plurality of multibeam elements 112' may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 112' may be substantially uniform or constant across the array. In other examples, the inter-element distance between the multibeam elements 112' may be varied one or both of across the array and along the length of the light guide 110.

According to various embodiments, a multibeam element 112' of the plurality is configured to scatter out a portion of the guided light 104 as the emitted light 102. Further, the emitted light 102 comprises a plurality of directional light beams 102'. In FIGS. 5A and 5C, the directional light beams 102' are illustrated as a plurality of diverging arrows depicted as being directed way from the first (or front) surface 110' of the light guide 110. According to various embodiments, the directional light beams 102' have different principal angular directions from one another. Further, the different principal angular directions of the directional light beams 102' correspond to respective different view directions of a multiview display comprising multiview pixels, according to various embodiments.

In addition, a size of the multibeam element 112' may be comparable to a size of a light valve (e.g., light valve 108, described below) of the multiview display, according to some embodiments. Herein, the 'size' may be defined in any of a variety of manners to include, but not be limited to, a length, a width or an area. For example, the size of the light valve may be a length thereof and the comparable size of the multibeam element 112' may also be a length of the multibeam element 112'. In another example, size may refer to an area such that an area of the multibeam element 112' may be comparable to an area of the light valve.

In some embodiments, the size of the multibeam element 112' is comparable to the light valve size such that the multibeam element size is between about twenty-five percent (25%) and about two hundred percent (200%) of the light valve size. In other examples, the multibeam element size is greater than about sixty percent (60%) of the light valve size, or about seventy percent (70%) of the light valve size, or greater than about eighty percent (80%) of the light valve size, or greater than about ninety percent (90%) of the light valve size, and the multibeam element 112' is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size. According to some embodiments, the comparable sizes of the multibeam element 112' and the light valve may be chosen to reduce, or in some examples to minimize, dark zones between views of the multiview display, while at the same time reducing, or in some examples minimizing, an overlap between views of the multiview display. FIGS. 5A-5C also illustrate multiview pixels 106 along with the multiview backlight 100' for the purpose of facilitating discussion. In FIGS. 5A-5B, the multibeam element size is denoted 's' and light valve size is denoted 'S'.

FIGS. 5A-5C further illustrate an array of light valves 108 configured to modulate the directional light beams 102' of the directional light beam plurality within the emitted light 102. The light valve array may be part of a multiview display that employs the multiview backlight 100', for example, and is illustrated in FIGS. 5A-5C along with the multiview backlight 100' for the purpose of facilitating discussion herein. In FIG. 5C, the array of light valves 108 is partially cut-away to allow visualization of the light guide 110 and the multibeam element 112' underlying the light valve array. In various embodiments, different types of light valves may be employed as the light valves 108 of the light valve array including, but not limited to, one or more of liquid crystal light valves, electrophoretic light valves, and light valves based on electrowetting.

As illustrated in FIGS. 5A-5C, different ones of the directional light beams 102' pass through and may be modulated by different ones of the light valves 108 in the light valve array. Further, as illustrated, a light valve 108 of the array corresponds to a view pixel, and a set of the light valves 108 corresponds to a multiview pixel 106 of a multiview display. In particular, a different set of light valves 108 of the light valve array is configured to receive and modulate the directional light beams 102' from different ones of the multibeam elements 112', i.e., there is one unique set of light valves 108 for each multibeam element 112', as illustrated.

As illustrated in FIG. 5A, a first light valve set 108a is configured to receive and modulate the directional light beams 102' from a first multibeam element 112'a, while a second light valve set 108b is configured to receive and modulate the directional light beams 102' from a second multibeam element 112'b. Thus, each of the light valve sets (e.g., the first and second light valve sets 108a, 108b) in the light valve array corresponds, respectively, to a different multiview pixel 106, with individual light valves 108 of the light valve sets corresponding to the view pixels of the respective multiview pixels 106, as illustrated in FIG. 5A.

In some embodiments, a shape of the multibeam element 112' is analogous to a shape of the multiview pixel 106 or equivalently, a shape of a set (or 'sub-array') of the light valves 108 corresponding to the multiview pixel 106. For example, the multibeam element 112' may have a square shape and the multiview pixel 106 (or an arrangement of a corresponding set of light valves 108) may be substantially square. In another example, the multibeam element 112' may have a rectangular shape, i.e., may have a length or longitudinal dimension that is greater than a width or transverse dimension. In this example, the multiview pixel 106 (or equivalently the arrangement of the set of light valves 108) corresponding to the multibeam element 112' may have an analogous rectangular shape. FIG. 5B illustrates a top or plan view of square-shaped multibeam elements 112' and corresponding square-shaped multiview pixels 106 comprising square sets of light valves 108. In yet other examples (not illustrated), the multibeam elements 112' and the corresponding multiview pixels 106 have various shapes including or at least approximated by, but not limited to, a triangular shape, a hexagonal shape, and a circular shape.

According to various embodiments, the multibeam elements 112' may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 112' comprising a diffraction grating is configured to diffractively scatter out the guided light portion as the plurality of directional light beams 102' having the different principal angular directions. In other embodiments, the multibeam element 112' comprising a micro-reflective element is configured to reflectively scatter out the guided light portion as the plurality of directional light beams 102', or the multibeam element 112' comprising a micro-refractive element is configured to scatter out the guided light portion as the plurality of directional light beams 102' by or using refraction (i.e., refractively scatter out the guided light portion).

In some embodiments, the collimated backlight 100 may be configured to provide the emitted light 102 having a narrow-angle illumination range (i.e., narrow-angle emitted light). For example, the collimated backlight 100 providing narrow-angle emitted light may be used in a privacy display. In these embodiments, the angle-preserving scattering feature 112 of the light guide 110 in the collimated backlight 100 may comprise array of angle-preserving scattering elements configured to scatter out a portion of the guided light as the narrow-angle emitted light 102". The collimated backlight 100 with a light guide 110 having an angle-preserving scattering feature 112 configured to provide narrow-angle emitted light may be referred to as a 'privacy' backlight, as is further described in more detail below with respect to a privacy display.

Figure 6A:
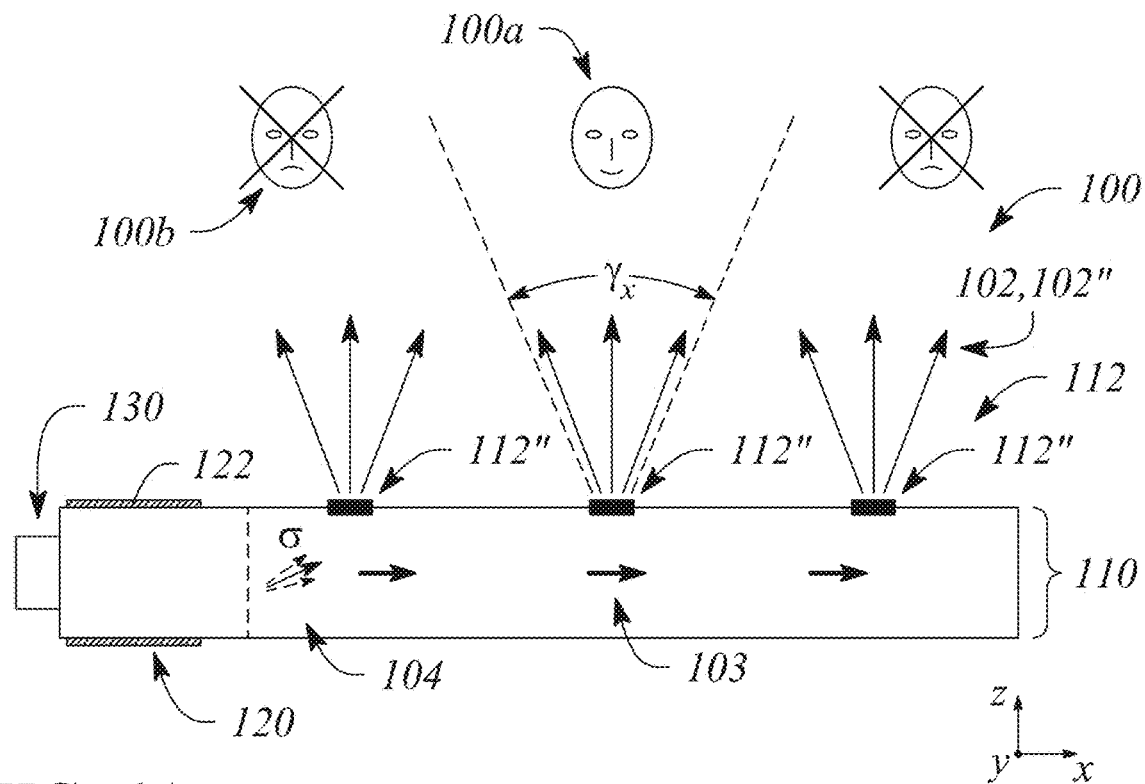
FIG. 6A illustrates a side view a collimated backlight configured to provide narrow-angle emitted light in an example, according to an embodiment consistent with the principles described herein.
Figure 6B:
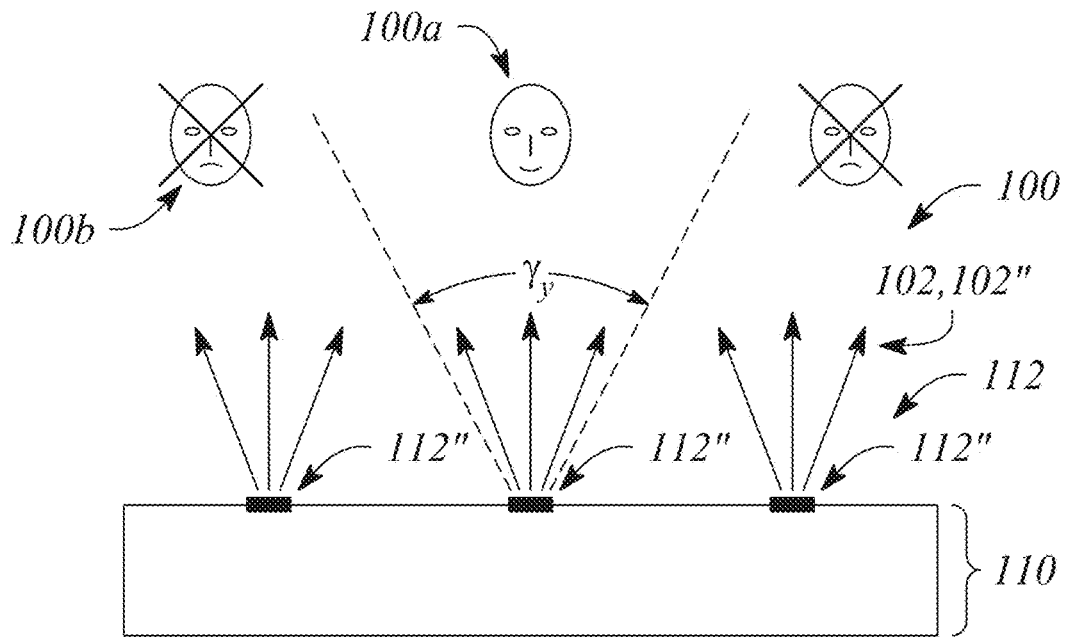
FIG. 6B illustrates another side view a collimated backlight configured to provide narrow-angle emitted light in an example, according to an embodiment consistent with the principles described herein.
Figure 6C:
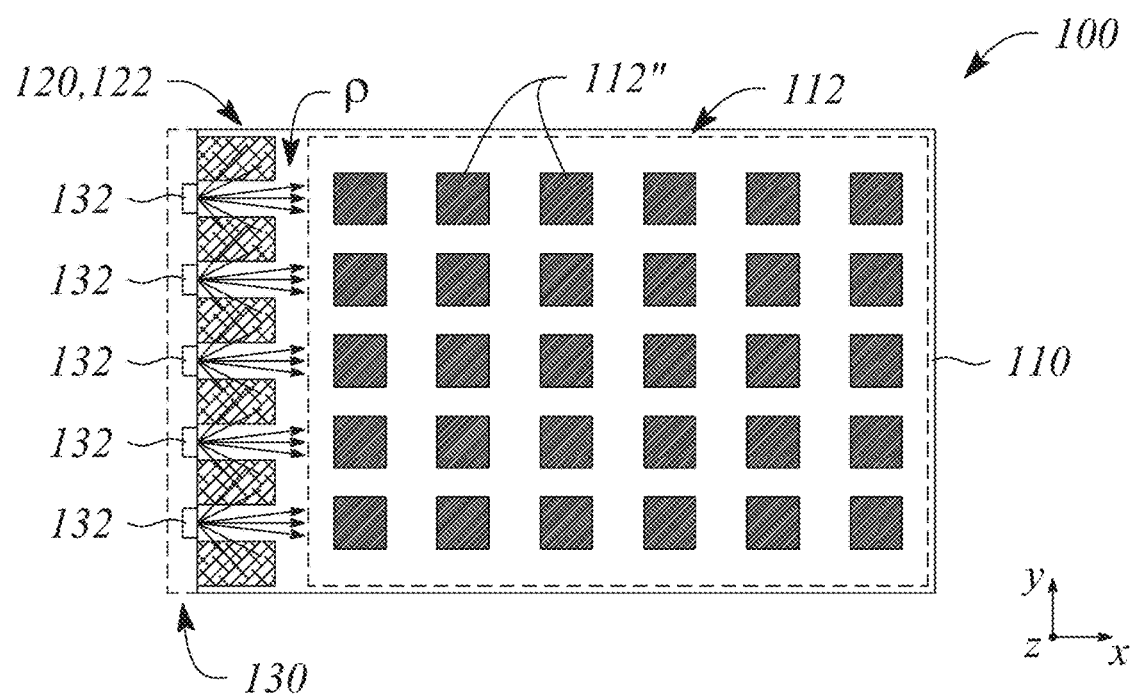
FIG. 6C illustrates a plan view a collimated backlight configured to provide narrow-angle emitted light in an example, according to an embodiment consistent with the principles described herein.

FIG. 6A illustrates a side view a collimated backlight 100 configured to provide narrow-angle emitted light 102" in an example, according to an embodiment consistent with the principles described herein. FIG. 6B illustrates another side view a collimated backlight 100 configured to provide narrow-angle emitted light 102" in an example, according to an embodiment consistent with the principles described herein. FIG. 6C illustrates a plan view a collimated backlight 100 configured to provide narrow-angle emitted light 102" in an example, according to an embodiment consistent with the principles described herein. In particular, FIG. 6A illustrates the collimated backlight in an x-z plane and FIG. 6B illustrates the collimated backlight in a y-z plane, and FIG. 6C illustrates the collimated backlight in an x-y plane. The collimated backlight 100 illustrated in In FIGS. 6A-6C may represent a privacy backlight used in a privacy display, for example.

As illustrated, the collimated backlight 100 comprises the light guide 110, the absorption collimator 120, and the light source 130, as described above. The light guide 110 of the collimated backlight 100 illustrated in FIGS. 6A-6C further includes an angle-preserving scattering feature 112 comprising an array of angle-preserving scattering elements 112". Angle-preserving scattering elements 112" of the angle-preserving scattering element array are configured to scatter out a portion of the guided light 104 as narrow-angle emitted light having a spread angle determined by the collimation factor in a width direction and corresponding to a view angle of the privacy display. In particular, the collimation factor ρ in the width direction may determine a predetermined spread angle $\gamma_y$ of the narrow-angle emitted light 102" in the y-direction, while another collimation factor σ of the guided light 104 may determine a predetermined spread angle $\gamma_x$ of the narrow-angle emitted light 102" in an x-direction, as illustrated. In turn, the predetermined spread angle $\gamma_x$ of the narrow-angle emitted light 102" in an x-direction may limit a view angle or view range of the narrow-angle emitted light 102" in the x-direction such that a viewer 100a may be able to see the narrow-angle emitted light 102", while another viewer 100b outside of the limited viewing angle or range is unable to see the narrow-angle emitted light 102", as illustrated in FIG. 6A. Similarly as illustrated in FIG. 6B, the viewer 100a located within a limited viewing angle or viewing range of the narrow-angle emitted light 102" in the y-direction provided by the predetermined spread angle $\gamma_y$ of the narrow-angle emitted light 102" in an y-direction may be able to see the narrow-angle emitted light 102", while the other viewer 100b outside of the limited viewing angle or range is unable to see the narrow-angle emitted light 102".

In various embodiments (not illustrated), the privacy display further comprising an array of light valves configured modulate the directional light beams as a private image to be displayed by the privacy display. For example, the array of light valves may be substantially similar to the array of light valves 108 described above. When the collimated backlight 100 configured as a privacy backlight as illustrated in FIG. 6A-6C is employed in a privacy display, the spread angles $\gamma_x$, $\gamma_y$ of the narrow-angle emitted light 102" provide similar limited viewing angles or ranges of a private image displayed by the privacy display. In various embodiments, an angle-preserving scattering element 112" of the angle-preserving scattering element array may comprises one ore more of a diffraction grating, a micro-reflective element and a micro-refractive element optically connected to the light guide to scatter out the portion of the guided light.

In some embodiments, the collimated backlight 100 is configured to be substantially transparent to light in a direction through the light guide 110 orthogonal to a propagation direction 103, 103' of the guided light 104. For example, the light may be able to pass through a thickness or height of the light guide 110 from the second surface 110" to the first surface 110' or visa versa due to the transparency. Transparency may be facilitated, at least in part, due to both the relatively small size of elements that make up the angle-preserving scattering feature 112 (e.g., the multibeam elements 112' or array of angle-preserving scattering elements 112"), and the relative large inter-element spacing of the these elements.

In accordance with some embodiments of the principles described herein, an electronic display is provided. The electronic display is configured to provide modulated emitted light as pixels of an image displayed by the electronic display. In some embodiments, the electronic display is a multiview display configured to provide a multiview image. In these embodiments, the modulated emitted light comprises modulated directional light beams that are preferentially directed toward a plurality of different viewing directions of the multiview display. Different ones of the modulated directional light beams may correspond to individual pixels of different 'views' associated with the multi-view image, according to various examples. The different views may provide a 'glasses free' (e.g., autostereoscopic) representation of information in the multiview image being displayed by the multiview display, for example. In other embodiments, the electronic display is a privacy display configured to provide a private image using the modulated emitted light. In these embodiments, the modulated emitted light comprises narrow-angle emitted light. Uses of the electronic display include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 7:
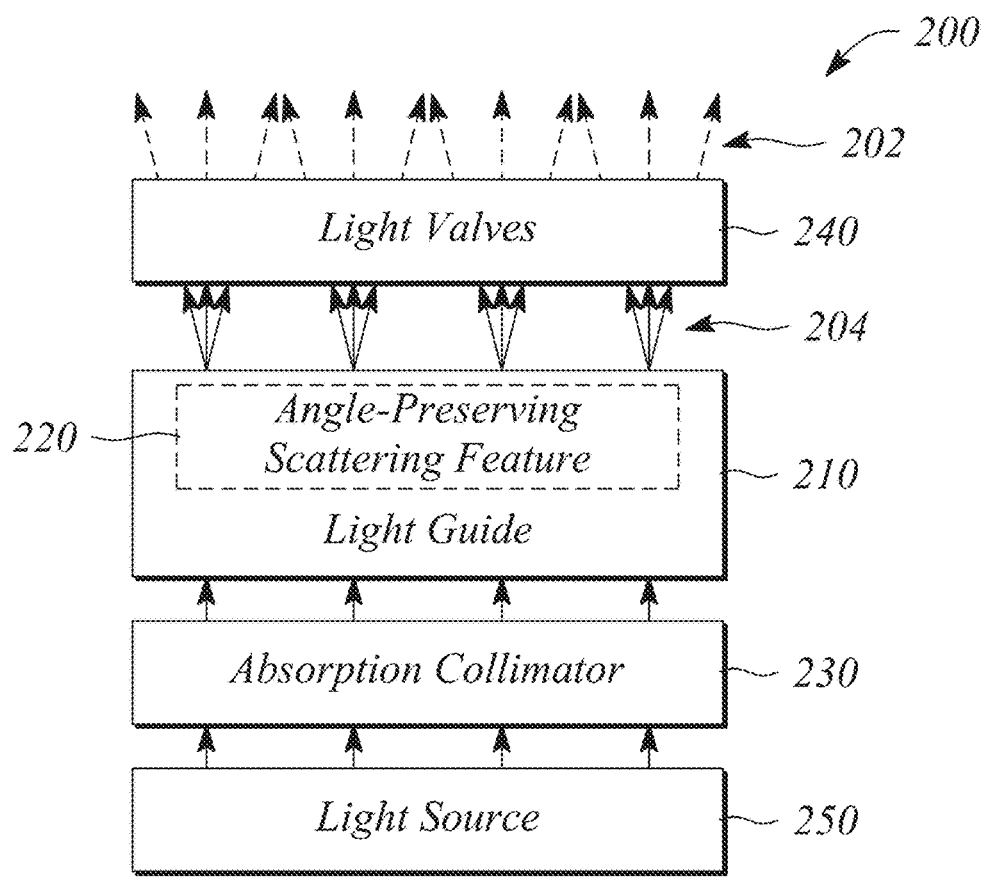
FIG. 7 illustrates a block diagram of an electronic display in an example, according to an embodiment consistent with the principles described herein.

FIG. 7 illustrates a block diagram of an electronic display 200 in an example, according to an embodiment consistent with the principles described herein. According to some embodiments, the electronic display 200 may be multiview display configured to display a multiview image according to different views in different view directions. In particular, modulated emitted light 202 of the electronic display 200 as a multiview display comprises a plurality of directional light beams that are modulated to display the multiview image and may correspond to pixels of the different views (i.e., view pixels). In other embodiments, the electronic display 200 may be a privacy display configured to display a private image using modulated emitted light 202 that is narrow-angle emitted light. Dashed lines are used for the arrows of the modulated emitted light 202 to emphasize the modulation thereof by way of example and not limitation.

The electronic display 200 illustrated in FIG. 7 comprises light guide 210. According to some embodiments, the light guide 210 may be substantially similar to the light guide 110, described above with respect to the collimated backlight 100. For example, the light guide 210 is configured to guide light according to total internal reflection as guided light in a propagation direction from an input edge of the light guide 210.

As illustrated in FIG. 7, the electronic display 200 further comprises an angle-preserving scattering feature 220. In some embodiments, the angle-preserving scattering feature 220 is substantially similar to the angle-preserving scattering feature 112 of the light guide 110, described above with respect to the collimated backlight 100. In particular, the angle-preserving scattering feature 220 may comprise an array of multibeam elements optically coupled to the light guide 210, according to some embodiments. The multibeam element array of the angle-preserving scattering feature 220 is configured to scatter out a portion of the guided light from the light guide 210 as directional light beams 204 having principal angular directions corresponding to view directions of different views of a multiview image of the electronic display 200. Moreover, the directional light beams 204 have different principal angular directions from one another. In other embodiments, the angle-preserving scattering feature 220 comprises an array of angle-preserving scattering elements configured to scatter out a portion of the guided light as narrow-angle emitted light.

The electronic display 200 illustrated in FIG. 7 further comprises an absorption collimator 230 comprising an absorption element extending in the propagation direction of the guided light within the light guide 210. The absorption collimator 230 is configured to absorb light from a light source and provide collimated light to the guided light prior to being scattered out by the multibeam element array as the directional light beams. In some embodiments, the absorption collimator 230 may be substantially similar to the absorption collimator 120 described above with respect to the collimated backlight 100. For example, the absorption element(s) of the absorption collimator 230 may comprise plurality of individual absorption elements spaced apart from one another. Further, the absorption element of the absorption collimator 230 may have a variable length profile, in some embodiments.

As illustrated in FIG. 7, the electronic display 200 further comprises an array of light valves 240. The array of light valves 240 is configured to modulate the directional light beams as the different views of the multiview image of the electronic display 200. In some embodiments, the array of light valves 240 may be substantially similar to the array of light valves 108 of the above-described collimated backlight 100. According to some embodiments, a size of an angle-preserving scattering element (e.g., a multibeam element) of the angle-preserving scattering element array is greater than about one quarter of a size of a light valve 240 of the light valve array and less than about twice the light valve size.

In some embodiments, the electronic display 200 may further comprise a light source 250. The light source 250 is configured to provide the light to be guided as the guided light. As such, the light source 250 may provide the light to the absorption collimator 230 to be converted into the guided light that is collimated. In some embodiments, the light may be provided to the absorption collimator 230 at or having one or both of a non-zero propagation angle and as collimated light that is collimated according to a collimation factor in a vertical direction. According to some embodiments, the light source 250 may be substantially similar to the light source 130 of the collimated backlight 100, described above. For example, the light source 250 may comprise a plurality light emitting diodes (LED) or more generally a plurality of optical emitters spaced apart from one another along and optically coupled to the input edge of the light guide 210. Further, when the light source 250 comprises a plurality of optical emitters and the absorption element of the absorption collimator 230 may comprise a plurality of individual absorption elements, where individual absorption elements of the plurality of individual absorption elements are located between optical emitters of the optical emitter plurality of the light source 250.

Figure 8:
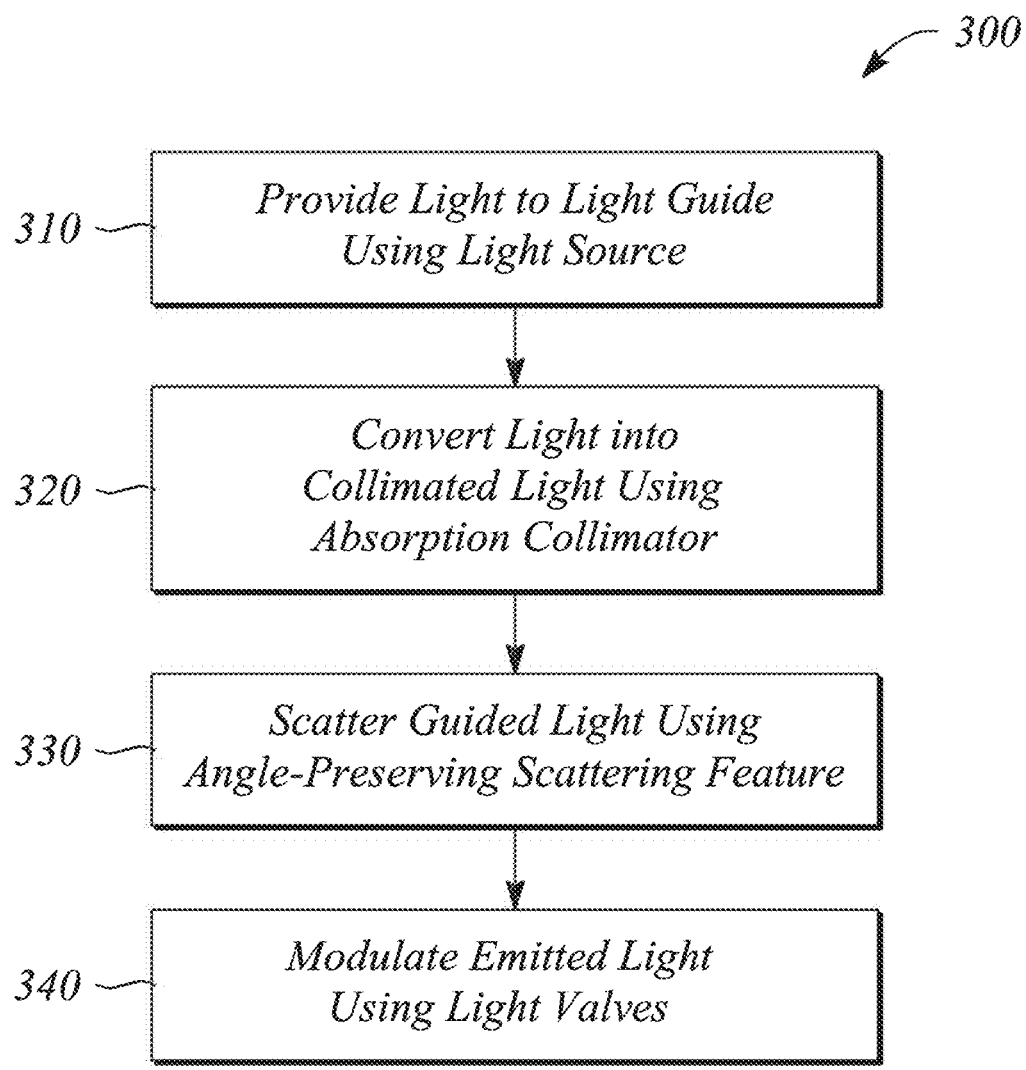
FIG. 8 illustrates a flow chart of a method of collimated backlight operation in an example, according to an embodiment consistent with the principles described herein.

In accordance with other embodiments of the principles described herein, a method of backlight operation is provided. FIG. 8 illustrates a flow chart of a method 300 of collimated backlight operation in an example, according to an embodiment consistent with the principles described herein. As illustrated in FIG. 8, the method 300 of collimated backlight operation (or multiview backlight operation) comprises providing 310 light to a light guide using a light source at an input edge of the light guide. In some embodiments, the light provided to the light guide by providing 310 light has a first spread angle. For example, the light source may comprise an optical emitter that is butt-coupled to the input edge and providing 310 light introduces light to the light guide having a first spread angle that is relatively broad. In some embodiments, the light guide and the light source as well as the provided light may be substantially similar respectively to the light guide 110, the light source 130 and the light that the light source 130 provides, described above with respect to the collimated backlight 100. For example, the light source used in providing 310 light may comprise a plurality of optical emitters spaced apart from one another along the input edge of the light guide.

The method 300 of collimated backlight operation illustrated in FIG. 8 further comprises converting 320 the provided light into collimated light within the light guide using an absorption collimator comprising an absorption element adjacent to the input edge of the light guide. Converting 320 the provided light into collimated light results light at an output of the absorption collimator of the collimated backlight that is collimated according to a collimation factor in a width directions, according to various embodiments. In particular, converting the light into collimated light reduces an angular spread of the light such that the collimated light may have a width-directed spread angle that is less than a spread angle of the provided light. In some embodiments, the absorption collimator used in converting 320 the provided light into collimated light may be substantially similar to the absorption collimator 120 described above with respect to the collimated backlight 100. In particular, the absorption element of the absorption collimator may extend in a direction corresponding to the propagation direction of the guided light within the light guide and further may comprise a plurality of individual absorption elements located between optical emitters of an optical emitter plurality of a light source used to provide the light to the light guide. That is, where the light source comprises a plurality of optical emitters spaced apart from one another, the absorption collimator may comprise a plurality of individual absorption elements spaced apart from one another and located between optical emitters of the optical emitter plurality of the light source.

As illustrated in FIG. 8, the method 300 of collimated backlight operation further comprises scattering 330 a portion of the guided light out of the light guide using an angle-preserving scattering feature of the light guide. In particular, the scattered-out portion of the guided light is emitted by the collimated backlight as emitted light. In some embodiments, the angle-preserving scattering feature may be substantially similar to the angle-preserving scattering feature 112 of the light guide 110, described above.

In some embodiments, the method 300 of collimated backlight operation further comprises modulating 340 the emitted light using an array of light valves. The emitted light may comprise directional light beams and the light valves may be configured as a multiview pixel of a multiview display, in some embodiments. In other embodiments, the emitted light comprises narrow-angle emitted light and the modulated emitted light represents a private image displayed on a privacy display. According to some embodiments, the plurality of light valves may be substantially similar to the array of light valves 108 described above with respect to FIGS. 5A-5C.

Thus, there have been described examples and embodiments of a collimated backlight, a method of collimated backlight operation, and an electronic display that include an absorption collimator configured to provide collimated light within a light guide. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A collimated backlight comprising:
    a light guide having an angle-preserving scattering feature that scatters guided light out of the light guide as emitted light;
    a light source comprising a plurality of optical emitters that provides light to the light guide as the guided light; and
    an absorption collimator between the light source and the angle-preserving scattering feature of the light guide, the absorption collimator comprising an absorption element that extends in a propagation direction of the guided light within the light guide,
    wherein the absorption collimator that collimates the light provided by the light source according to a collimation factor in a width direction orthogonal to a propagation direction of the guided light.

2. The collimated backlight of claim 1, wherein the absorption collimator is further configured to reduce an angular spread of the light to collimate the guided light according to a collimation factor.

3. The collimated backlight of claim 1, wherein the absorption element of the absorption collimator comprises a layer of absorptive material on a surface of the light guide.

4. The collimated backlight of claim 3, wherein layer of absorptive material is on two opposing surfaces of the light guide.

5. The collimated backlight of claim 1, wherein the absorption element of the absorption collimator comprises an absorptive material disposed between a first surface and a second surface of the light guide.

6. The collimated backlight of claim 1, wherein the absorption element of the absorption collimator comprises a plurality of individual absorption elements located between optical emitters of the optical emitter plurality, the optical emitters being spaced apart from one another along an input edge of the light guide.

7. The collimated backlight of claim 6, wherein a length profile of the absorption element in the propagation direction of the guided light varies as a function of distance along an input edge of the light guide.

8. A multiview display comprising the collimated backlight of claim 1, wherein the angle-preserving scattering feature comprising an array of multibeam elements that scatters out a portion of the guided light as directional light beams having principal angular directions corresponding to view directions of different views of a multiview image of the multiview display, the multiview display further comprising an array of light valves that modulates the directional light beams as the different views of the multiview image.

9. The multiview display of claim 8, wherein a multibeam element of the multibeam element array comprises one or more of a diffraction grating, a micro-reflective element and a micro-refractive element optically connected to the light guide to scatter out the portion of the guided light.

10. A privacy display comprising the collimated backlight of claim 1, wherein the angle-preserving scattering feature comprises an array of angle-preserving scattering elements that scatters out a portion of the guided light as narrow-angle emitted light having an spread angle determined by the collimation factor in a width direction and corresponding to a view angle of the privacy display, the privacy display further comprising an array of light valves that modulates the narrow-angle emitted light as a private image to be displayed by the privacy display.

11. The privacy display of claim 10, wherein an angle-preserving scattering element of the angle-preserving scattering element array comprises at least one or more of a diffraction grating, a micro-reflective element and a micro-refractive element optically connected to the light guide to scatter out the portion of the guided light.

12. An electronic display comprising:
    a light guide that guides light as guided light;
    an array of angle-preserving scattering elements that scatters out a portion of the guided light as emitted light;
    an absorption collimator comprising an absorption element extending in a propagation direction of the guided light and that converts light from a light source into the guided light that is collimated prior to the guided light being scattered out by the angle-preserving element array; and
    an array of light valves that modulates the emitted light as a displayed image,
    wherein the electronic display is one of a multiview display that provides a multiview image or a privacy display that provides a private image.

13. The electronic display of claim 12, further comprising a light source that provides the light to be guided as the guided light, the light source comprising a plurality of optical emitters spaced apart from one another along an input edge of the light guide.

14. The electronic display of claim 13, wherein the absorption element of the absorption collimator comprises a plurality of individual absorption elements located between optical emitters of the optical emitter plurality of the light source.

15. The electronic display of claim 14, wherein a length profile of individual absorption elements of the individual absorption element plurality in the propagation direction of the guided light varies as a function of distance along an input edge of the light guide.

16. The electronic display of claim 12, wherein a size of an angle-preserving scattering element of the angle-preserving scattering element array is greater than one quarter of a size of a light valve of the light valve array and less than twice the light valve size.

17. The electronic display of claim 12, wherein angle-preserving scattering elements of the angle-preserving scattering element array comprise multibeam elements that scatters out the portion of the guided light as directional light beams having directions corresponding to different views of the multiview image, the electronic display being the multiview display.

18. The electronic display of claim 17, wherein the multibeam elements comprise one or more of a diffraction grating, a micro-reflective element and a micro-refractive element optically connected to the light guide to scatter out the portion of the guided light.

19. The electronic display of claim 12, wherein angle-preserving scattering elements of the angle-preserving scattering element array scatter out a portion of the guided light as narrow-angle emitted light having an spread angle determined by a collimation factor in a width direction provided by the absorption collimator, the electronic display further comprising an array of light valves that modulates the narrow-angle emitted light as a private image, the electronic display being the privacy display.

20. A method of collimated backlight operation, the method comprising:
  providing light to a light guide using a light source at an input edge of the light guide;
  converting the provided light into collimated light within the light guide using an absorption collimator to provide guided light within the light guide, the absorption collimator comprising an absorption element adjacent to the input edge of the light guide that extends in a direction corresponding to a propagation direction of the guided light within the light guide; and
  scattering a portion of the guided light out of the light guide as emitted light using an angle-preserving scattering feature of the light guide.

* * * * *